Nov. 14, 1950     R. L. CHAMBERLIN     2,529,594
COLLECTING ELECTRODE STRUCTURE
FOR ELECTRICAL PRECIPITATORS
Filed Dec. 22, 1947
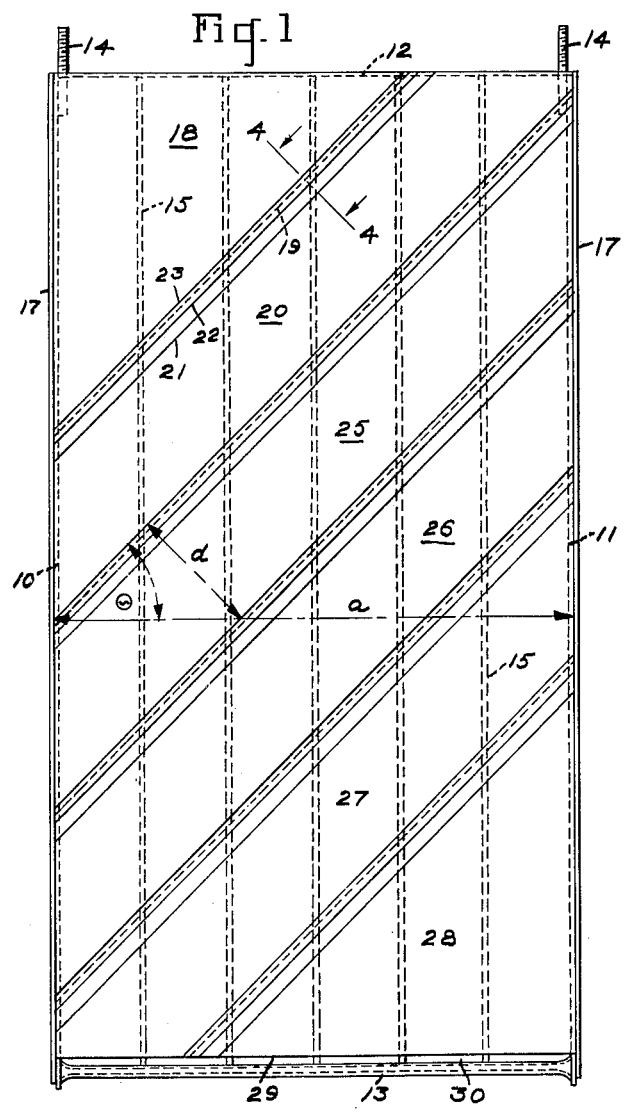
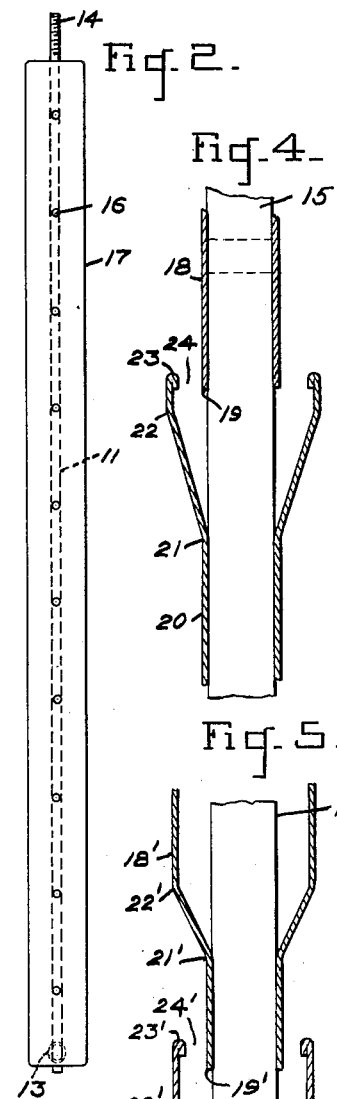
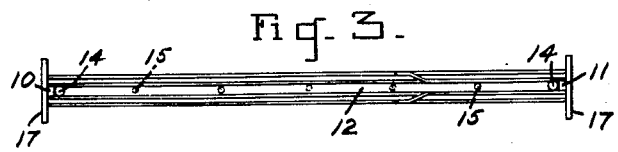
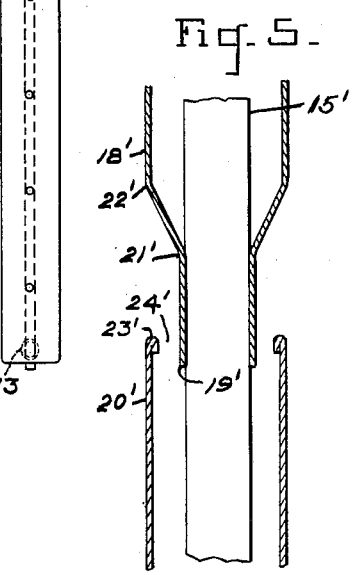
INVENTOR.
Ralph L. Chamberlin
BY
Stowell & Evans,
Attorneys.

Patented Nov. 14, 1950

2,529,594

UNITED STATES PATENT OFFICE 2,529,594

COLLECTING ELECTRODE STRUCTURE FOR ELECTRICAL PRECIPITATORS

Ralph L. Chamberlin, Middlesex, N. J., assignor to Research Corporation, New York, N. Y., a corporation of New York Application December 22, 1947, Serial No. 793,301

1 Claim. (Cl. 183—7)

This invention relates to electrical precipitation and more particularly to a collecting electrode structure for use in electrical precipitators.

An object of the invention is to provide a collecting electrode structure that is especially adapted to the collection of light fluffy dusts that are subject to being eroded from the surfaces of the collecting electrode by the gas stream flowing thereover and re-entrained in the gas stream with resultant decrease in cleaning efficiency of the precipitator.

Another object is to provide a composite plate collecting electrode structure having an internal space and slots opening from the collecting surfaces of the structure into the internal space through which dust is removed from the collecting surfaces.

A further object is to provide a composite collecting electrode structure that is economical to fabricate, that is rigid and durable and that has an extended service life.

Still another object is to provide a collecting electrode structure that is preferably rectangular in shape for most efficient use of available precipitation chamber space and has dust removal slots obliquely disposed with respect to the structure whereby to adapt the structure to precipitators wherein the direction of gas flow is either horizontal or vertical.

Typically, the electrical precipitator collecting electrode structure of the invention includes a substantially rectangular frame, and a plurality of plate members mounted on each face of the frame in substantially parallel relation to provide substantially continuous surfaces on each face of the frame and to define a hollow space therebetween, adjacent plates on each face of the frame having substantially parallel edges obliquely disposed with respect to the frame, the upper edge of a subjacent plate cooperating with the lower edge of a superjacent plate to provide slots opening into the hollow space. The cooperating edges of adjacent plates typically are overlapped and spaced apart to provide the slots. The frame members may provide walls to the hollow space along the top and sides of the structure, while the bottom of the structure is open to allow dust to fall from the interior of the structure into receptacles suitably disposed therebeneath.

The frame may also include a plurality of longitudinally spaced, parallel vertical members within the hollow space to increase the strength of the structure and to act as baffles minimizing eddy currents within the hollow space of the structure without interfering with the downward passage of dust through the interior of the structure.

In addition, the electrode structure may have exterior baffles at the ends of the frame protruding from the plane of the dust collecting surfaces into the gas stream flowing generally across the collecting surfaces for the purpose of reducing gas velocity, to the extent local velocities may be excessive, adjacent to the collecting surfaces and thus reducing conditions tending to erode precipitated dust from the collecting surfaces. The baffles also add mechanical strength to the electrode structure and cause more even flow of gases through the precipitating zones between adjacent electrodes.

The invention will be described in greater detail, and other of its objects and advantages will be in part apparent and in part pointed out in the following detailed description of an illustrative embodiment thereof, as shown in the accompanying drawings, in which:

Fig. 1 is an elevational view of one form of collecting electrode structure in accordance with the invention;

Fig. 2 is a right side view of the structure of Fig. 1;

Fig. 3 is a plan view thereof;

Fig. 4 is a sectional view taken along the plane of the line 4—4 of Fig. 1 looking in the direction of the arrows; and Fig. 5 is a sectional view similar to Fig. 4 showing a modified form of slot arrangement.

In the drawings, Figs. 1, 2, and 3, the composite electrode structure shown includes a frame having vertical side members 10 and 11 and a top member 12 of flat bar stock welded together at the top corners of the frame. A section of pipe 13 is flattened at the ends and welded between the bottom ends of the vertical frame members 10 and 11 to complete the rectangular frame. A pair of short vertical rods 14 having threaded upper ends are welded into the joint at the top corners of the frame and provide hangers to support the electrode structure in an electrical precipitator.

Welded between the top and bottom frame members 12 and 13 are a plurality of horizontally spaced, parallel, vertical rods 15. These rods provide additional strength and rigidity to the frame and also serve a purpose to which general reference has already been made and which will be pointed out in greater detail hereinafter.

Plug welded through holes 16 to the side frame members 10 and 11 are vertical baffle plates 17 that extend from top to bottom of the frame and project at right angles from the frame a short distance from each face thereof.

In fabricating the composite electrode structure, a triangular plate 18 is welded to the top left-hand corner of the frame. In the particular structure shown, the hypotenuse 19 of the triangular plate 18 makes an angle of 45° with the horizontal edges of the frame, but this angle may vary within limits to be defined hereinafter.

A second plate 20, suitably shaped at the ends to conform to the edges of the frame, is welded to the frame. As best seen in Fig. 4, the upper edge of the plate 20 is bent outwardly along the line 21 and inwardly along the line 22 to provide a flared upper plate portion, the upper edge 23 of which overlaps the lower edge 19 of the superjacent plate 18. The edge 23 may be beaded, as shown. The contiguous portions of the plates 18 and 20 define a slot 24.

Plates 25, 26, 27 and 28, suitably shaped to fit the frame, are thereafter welded in place as shown in Fig. 1. Each subjacent plate has its upper edge portion flared, as shown in Fig. 4, and lapped over the lower edge of a superjacent plate to provide a plurality of slots similar to and parallel to the slot 24. The slots are disposed at an oblique angle with respect to the edges of the frame.

It will be noted that the bottom edge 29 of the plate assembly is located above and parallel to the frame member 13, and provides with the frame member 13 a downwardly opening slot 30.

The reverse face of the frame has disposed thereon a set of plates similar to those on the obverse face seen in Fig. 1. The reverse face presents a mirror-image appearance of the obverse face.

It will be understood that the sets of substantially parallel plates on opposite faces of the frame define a hollow space therebetween into which the oblique slots 24 gives access. This space may be divided, as by the rods 15, into a plurality of parallel vertical conduits extending downwardly from the top frame member 12 and opening at the bottom through the slot 30.

In the modified form of electrode structure shown in Fig. 5, the plates 18' and 20' correspond to the plates 18 and 20 in Figs. 1–4. In the modified form of Fig. 5, the plates on opposite faces of the frame are spaced somewhat farther from each other than in the previously described modification, and the slots 24' are formed by bending the lower portions of superjacent plates such as 18' along the lines 22' and 21' to form an inwardly flared bottom configuration which is received between the top edges 23' of the straight upper walls of the subjacent plates 20'.

Although the illustrative structures have been referred to as being fabricated by welding, it will be understood that other modes of fabrication may be employed to make the structure of the invention. The electrode structure is preferably formed of steel components but other metals and conductive materials may be used instead.

The illustrative embodiment shown in Figs. 1–4 is designed to be incorporated in an electrical precipitator in combination with a precipitator chamber housing with suitable gas inlet and outlet means so that gas flows across the electrode structure horizontally from left to right as seen in Fig. 1. The spacing of the oblique slots is such that any horizontal line extending across the plate in the direction of gas flow intersects at least one slot. This condition is met where the perpendicular distance $d$ between adjacent slots is less than the width $a$ of the structure in the direction of gas flow times the sine of the angle $\theta$ which the slots make with an edge of the frame parallel to the direction of gas flow. This relationship may be expressed mathematically as follows:

$$d < a \sin \theta$$

where $\theta$ is an acute angle greater than 0° and less than 90°.

Although the above relationship establishes a maximum value for the distance between slots, in practice such distance is normally less than about one-half the maximum value given by the formula and preferably greater than about one-quarter of such value. In the embodiment shown, the value of $d$ is approximately one-third the maximum value given by the formula.

In practice, the angle $\theta$ is preferably about 45° but may advantageously vary between about 20° and about 70°.

As will be understood by persons skilled in the art of electrical precipitation, a plurality of the collecting electrode structures of the invention are vertically disposed in the collecting chamber of an electrical precipitator in spaced relation and parallel to the direction of gas flow through the chamber. The illustrated collecting electrode structure is particularly adapted to be incorporated in precipitators of the horizontal flow type and the collecting electrodes are oriented with their slots 24 facing in the upstream direction. Gas baffles constrain the stream of gas to be cleaned to a level above the bottom edges 29 of the collecting plates and dust receiving hoppers are positioned below the bottom openings 30.

Complementary discharge electrodes are disposed between opposed faces of the collecting electrode structures, as is conventional. When such a precipitator is energized by a suitable high potential impressed across the space between the discharge and collecting electrodes and a stream of gas bearing suspended dust or the like is passed through the precipitation zone, the suspended particles are charged and precipitated upon the plate surfaces of the collecting electrode structures.

The collecting electrode structures may be subjected to continuous or periodic rapping to dislodge dust accumulating on the faces of the collecting plates. Such dislodged dust is carried into the slots 24 by the gas stream and/or by the effect of gravity thereon and down through the hollow space within the structure to issue from the openings 30 and drop into suitable dust receiving hoppers beneath the precipitation zone.

From the foregoing description it will be seen that the present invention provides a composite collecting electrode structure wherein the obliquely disposed slots permit the structure to be used for either vertical or horizontal gas flow and in which the slots are advantageously disposed with respect to the gas stream flow to withdraw precipitated dust from the precipitation zone in an efficient manner.

The contiguous edges of adjacent plates need not overlap but may terminate at the same level or the lower edges of the plates may terminate above the upper edges of the subjacent plates. It is desirable, however, that at least one of the contiguous edges be warped from the general plane of the plates to provide upwardly and outwardly opening slots between adjacent plates.

I claim:

In an electrical precipitator including gas inlet and outlet means for establishing a horizontal flow of gas therethrough, a collecting electrode structure comprising a substantially rectangular frame substantially vertically disposed in the gas stream and parallel to the direction of gas flow, a plurality of plate members mounted on each face of said frame in substantially parallel relation to provide extended surfaces on each face of said frame substantially continuous between edges of said frame, said plate members defining a hollow space therebetween, adjacent plates on each face of said frame having substantially parallel edges obliquely disposed with respect to said frame, the upper edge of a subjacent plate overlapping the lower edge of a superjacent plate and the overlapping portions of adjacent plates being spaced apart to provide slots obliquely facing the stream of gas flowing through the precipitator, said slots opening into said hollow space, vertical baffle plates on opposite edges of said frame extending transversely to the direction of gas flow through the precipitator and substantially beyond the extended surfaces of the electrode structure, and a plurality of horizontally spaced vertical frame members confined within said hollow space and extending between opposed interior surfaces of said plate members to divide said space into a plurality of vertical dust conduits.

RALPH L. CHAMBERLIN.

REFERENCES CITED

The following references are of record in the file of this patent:

UNITED STATES PATENTS

| Number | Name | Date |
|---|---|---|
| 1,882,949 | Ruder | Oct. 18, 1932 |
| 2,271,597 | Lodge | Feb. 3, 1942 |

FOREIGN PATENTS

| Number | Country | Date |
|---|---|---|
| 114,444 | Australia | Dec. 19, 1941 |
| 369,825 | Germany | Feb. 23, 1923 |
| 721,232 | France | Dec. 12, 1931 |